United States Patent
Angelo

(10) Patent No.: US 11,660,992 B2
(45) Date of Patent: May 30, 2023

(54) HEADREST ASSEMBLY WITH FRICTION HINGE

(71) Applicant: WINDSOR MACHINE AND STAMPING (2009) LTD., Windsor (CA)

(72) Inventor: Collins Angelo, Windsor (CA)

(73) Assignee: WINDSOR MACHINE AND STAMPING (2009) LTD., Windsor (CA)

( * ) Notice: Subject to any disclaimer, the term of this patent is extended or adjusted under 35 U.S.C. 154(b) by 0 days.

(21) Appl. No.: 17/471,441

(22) Filed: Sep. 10, 2021

(65) Prior Publication Data

US 2022/0072984 A1    Mar. 10, 2022

Related U.S. Application Data

(60) Provisional application No. 63/076,565, filed on Sep. 10, 2020.

(51) Int. Cl.

| | |
|---|---|
| *B60N 2/818* | (2018.01) |
| *B60N 2/885* | (2018.01) |
| *B60N 2/829* | (2018.01) |
| *B60N 2/806* | (2018.01) |

(52) U.S. Cl.
CPC ............. *B60N 2/885* (2018.02); *B60N 2/806* (2018.02)

(58) Field of Classification Search
CPC ........... B60N 2/885; B60N 2/806; B60N 2/80
See application file for complete search history.

(56) References Cited

U.S. PATENT DOCUMENTS

| | | | | |
|---|---|---|---|---|
| 7,500,721 | B2 * | 3/2009 | Beroth | B64D 11/0642 |
| | | | | 297/410 |
| 9,393,892 | B1 | 7/2016 | Millan | |
| 9,446,694 | B2 * | 9/2016 | Szczygiel | B60N 2/885 |
| 10,252,657 | B2 * | 4/2019 | Lessard | B60N 2/885 |
| 10,399,474 | B2 * | 9/2019 | Kapusky | B60N 2/821 |
| 10,953,989 | B1 * | 3/2021 | Mansouri | B60N 2/809 |
| 10,960,801 | B2 * | 3/2021 | Novin | B60N 2/85 |

(Continued)

FOREIGN PATENT DOCUMENTS

KR        101857037 B1    6/2018

OTHER PUBLICATIONS

Extended European Search Report regarding corresponding EP App. No. 21195948.1; dated Feb. 11, 2022.

*Primary Examiner* — Shin H Kim
(74) *Attorney, Agent, or Firm* — Dickinson Wright PLLC

(57) ABSTRACT

A headrest assembly for use in a vehicle includes a housing having a front portion and a rear portion. The headrest assembly also includes an armature operatively coupling the rear portion to a seatback of an automobile seat. The front portion includes a central panel, a first side panel, and a second side panel, wherein the first side panel pivots relative to the central panel about a first vertical axis, and the second side panel pivots relative to the central panel about a second vertical axis. The headrest assembly also includes a first spring clip assembly connecting the first side panel to a side of the central panel and a second spring clip assembly connecting the second side panel to an opposite side of the central panel, the first and second spring clip assemblies maintaining an angular position of the first and second side panels absent manual adjustment.

14 Claims, 12 Drawing Sheets

(56) References Cited

U.S. PATENT DOCUMENTS

| | | | |
|---|---|---|---|
| 11,332,058 B2* | 5/2022 | Jeong | B60N 2/806 |
| 11,396,251 B2* | 7/2022 | Clough | B60N 2/242 |
| 2004/0195893 A1* | 10/2004 | Clough | A47C 7/38 |
| | | | 297/391 |
| 2004/0217639 A1 | 11/2004 | Clough | |
| 2005/0121963 A1* | 6/2005 | Williamson | B60N 2/01508 |
| | | | 297/408 |
| 2007/0108827 A1* | 5/2007 | Clough | B60N 2/885 |
| | | | 297/391 |
| 2007/0228792 A1* | 10/2007 | Chen | B60N 2/2866 |
| | | | 297/284.9 |
| 2009/0302660 A1* | 12/2009 | Karlberg | B60N 2/885 |
| | | | 297/407 |
| 2017/0197529 A1* | 7/2017 | Hontz | B64D 11/0646 |
| 2017/0368970 A1* | 12/2017 | Lessard | B60N 2/885 |

\* cited by examiner

HEADREST ASSEMBLY WITH FRICTION HINGE

CROSS-REFERENCE TO RELATED APPLICATION

This application claims priority to U.S. Provisional Patent Application Ser. No. 63/076,565, filed Sep. 10, 2020, the disclosure of which is incorporated by reference herein in its entirety.

FIELD OF THE INVENTION

The present invention relates to vehicle headrests and, more particularly, to a headrest assembly that is adjustable with a friction hinge.

BACKGROUND

This section provides background information related to the present disclosure which is not necessarily prior art.

Technological improvements of automobiles have generally been focused on categorical enhancements to efficiency, safety and comfort. Often, an improvement in one category detracts from one of the other categories. For example, there has been a consistent struggle throughout the historical development of automobiles to find a balance between strength and weight. While incorporating stronger components may ultimately lead to a safer driving experience, stronger materials are typically heavier than other materials and thus detract from operational efficiency, e.g., fuel economy. Similarly, a focus primarily on efficiency can lead to components that are vulnerable to accidents and normal wear and tear.

One example component of an automobile that has historically been developed with an emphasis on strength and comfort is a headrest. Most automobiles include headrests atop an occupant's seat and in a position adjacent the occupant's head. Because headrests are specifically designed to interface with an occupant's head, they must be comfortable both tactilely and positionally. In addition to comfort, headrests must be able to withstand amounts of impact to prevent whiplash to the occupant during a collision and, to a certain extent, block foreign objects in the event of a crash or sudden braking situation. Developments in comfort functionality and, more particularly, positional adjustment for both safety and comfort have resulted in headrests having relatively complicated adjustment mechanisms that allow several users of varying sizes and preferences to adjust to the headrest to an ideal position.

Accordingly, there is a continued desire to develop headrests that provide positional comfort, that are strong, and that are relatively inexpensive to produce and assemble.

SUMMARY OF THE INVENTION

This section provides a general summary of the disclosure and is not to be interpreted as a complete and comprehensive listing of all of the objects, aspects, features and advantages associated with the present disclosure.

In accordance with one aspect of the disclosure, a headrest assembly for use in a vehicle includes a housing having a front portion and a rear portion, the front portion including a central panel, a first side panel, and a second side panel. The headrest assembly also includes a first spring clip connecting the first side panel to a first side of the central panel. The headrest assembly further includes a second spring clip connecting the second side panel to a second side of the central panel. The headrest assembly yet further includes a first pin operatively coupled to the first side panel and rotatable within a portion of the first spring clip to allow rotation of the first side panel relative to the central panel. The headrest assembly also includes a second pin operatively coupled to the second side panel and rotatable within a portion of the second spring clip to allow rotation of the second side panel relative to the central panel. Each of the first spring clip and the second spring clip includes a tail portion coupled to the central portion. Each of the first spring clip and the second spring clip also includes a cam portion in contact with the respective pin to maintain an angular position of the first side panel and the second side panel relative to the central panel.

According to another aspect of the disclosure, a headrest assembly for use in a vehicle includes a housing having a front portion and a rear portion. The headrest assembly also includes an armature operatively coupling the rear portion to a seatback of an automobile seat. The headrest assembly further includes the front portion including a central panel, a first side panel, and a second side panel. The headrest assembly yet further includes a first spring clip connecting the first side panel to a side of the central panel and a second spring clip connecting the second side panel to an opposite side of the central panel. The first spring clip and second spring clip each include a cam portion to allow the first side panel and the second side panel to pivot about at least one substantially vertical axis relative to the central panel.

According to yet another aspect of the disclosure, a headrest assembly for use in a vehicle includes a housing having a front portion and a rear portion. The headrest assembly also includes an armature operatively coupling the rear portion to a seatback of an automobile seat. The front portion includes a central panel, a first side panel, and a second side panel, wherein the first side panel pivots relative to the central panel about a first vertical axis, and the second side panel pivots relative to the central panel about a second vertical axis. The headrest assembly also includes a first spring clip assembly connecting the first side panel to a side of the central panel and a second spring clip assembly connecting the second side panel to an opposite side of the central panel, the first and second spring clip assemblies maintaining an angular position of the first and second side panels absent manual adjustment.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustrative purposes only of selected embodiments and are not intended to limit the scope of the present disclosure. The inventive concepts associated with the present disclosure will be more readily understood by reference to the following description in combination with the accompanying drawings wherein.

DETAILED DESCRIPTION

Example embodiments will now be described more fully with reference to the accompanying drawings. In general, the subject embodiments are directed to a headrest assembly for an automobile, with the headrest assembly including two moveable side panels that are each pivotal about an axis. However, the example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that some specific details need not be employed, that example embodiments may be embodied in many different forms and that neither should be construed to limit the scope of the disclosure. In some example embodiments, well-known processes, well-known device structures, and well-known technologies are not described in detail.

Referring to the Figures, wherein like numerals indicate corresponding parts throughout the views, the headrest assembly is intended for providing an enhanced travel experience to occupants of an automobile by allowing the headrest assembly to be adjustable about at least one vertical axis.

Figure 1:
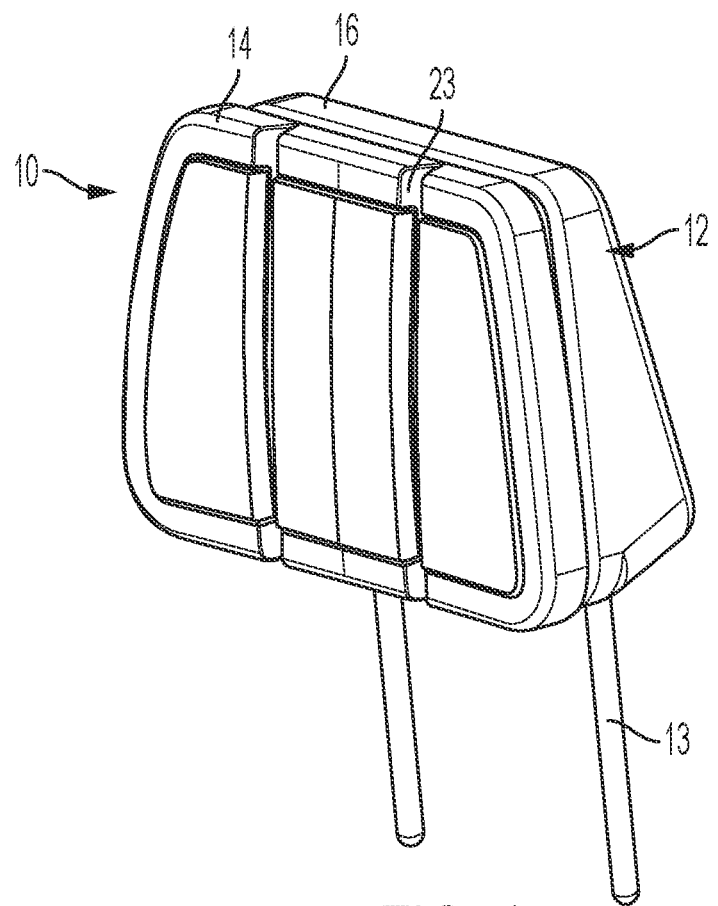
FIG. 1 is a front perspective view of a headrest assembly for an automobile in a non-adjusted position.

Referring to FIG. 1, a headrest assembly is depicted. The headrest assembly is generally referred to with numeral 10. The headrest assembly 10 includes a housing 12 that at least partially encloses several components associated with stabilization and/or adjustment of the headrest assembly 10. A cushion and a cover (not shown) may be provided over the housing 12 for aesthetic purposes and occupant comfort, i.e., tactile comfort. A base portion 13 (which may also be referred to as "armature") is mountable to an automobile seat and, more specifically, to a top surface of a seatback of the automobile seat (not shown). The housing 12 includes a rear portion 16 and a front portion 14. The rear portion 16 is connected to the armature 13 and the front portion 14 is connected to the rear portion 16 such that vertical movement of armature 13 moves both the rear portion 16 and front portion 14. However, in some embodiments the front portion 14 may be independently moveable in the vertical direction relative to the rear portion 14. The headrest assembly 10 in FIG. 1 is shown in a non-adjusted position, wherein the front portion 14 is located in a default position with respect to the rear portion 16 such that the front portion 14 is primarily planar.

Figure 2:
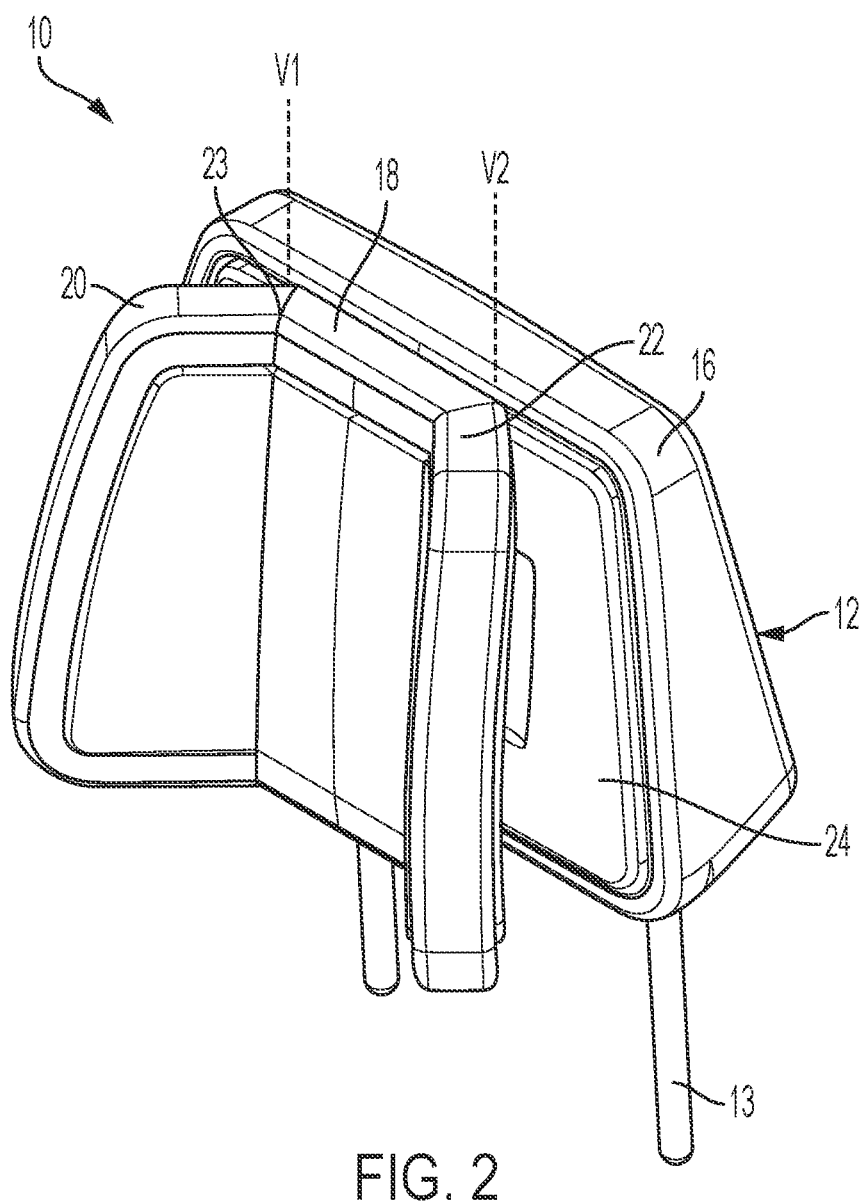
FIG. 2 is front perspective view of the headrest assembly in an adjusted position wherein a front portion is pivoted relative to a rear portion.
Figure 3:
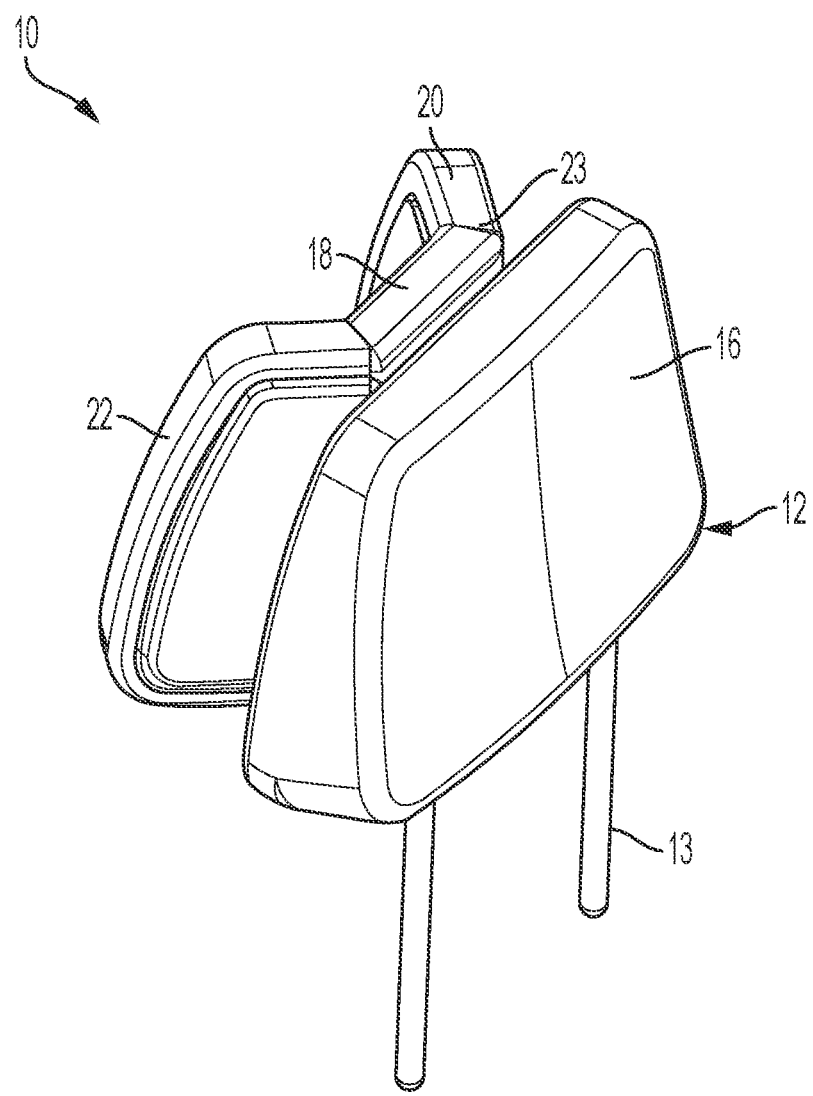
FIG. 3 is rear perspective view of the headrest assembly in the adjusted position.

As best illustrated in FIGS. 2 and 3, the front portion 14 includes a central panel 18, a first side panel 20, and a second side panel 22. The first side panel 20 and the second side panel 22 are spaced apart by, and on opposite sides of, the central panel 18. The headrest assembly 10 is shown in the adjusted position wherein one or both of the first side panel 20 and second side panel 22 have been pivoted about at least one substantially vertical axis (V1 or V2) with respect to the central panel 18 with the outer edges of the side panels 20, 22 moved away from the rear portion 16 of the headrest assembly 10. More particularity, the first panel 20 pivots about a first vertical axis V1 and the second panel 22 pivots about a second vertical axis V2 (FIG. 2). As noted above, axes V1 and V2 may be referred to herein as vertical axes, but it is to be understood that these are "substantially" vertical axes, such that literally vertical may be present in some embodiments. The first vertical axis V1 and the second vertical axis V2 may be substantially vertical, meaning that they allow the first and second panels 20, 22 to be pivoted or otherwise adjusted to different positions to provide varied support to a user's head in the cross-car and fore-aft directions.

One or more adjacent vertical edges of the side panels 20, 22, and central panel 18 may include a tapered surface 23 so that the pivotal movement is not encumbered. The pivoting and pivotal movement described herein may also be referred to as rotating or tilting action. The extent of the movement of the headrest 10 may vary depending upon the particular application of use. In some arrangements, the first side panel 20 and second side panel 22 may both be pivotal up to about 180° to bring the first side panel 20 and second side panel 22 into substantially flush contact with the central panel 18. In other arrangements the first side panel 20 and second side panel 22 may be pivotal to a smaller degree, such as up to 90°, up to 45°, or 45° or less, for example. As best shown in FIG. 2, the rear portion 16 includes a connection plate 24 that is connected to the central panel 18.

Figure 4:
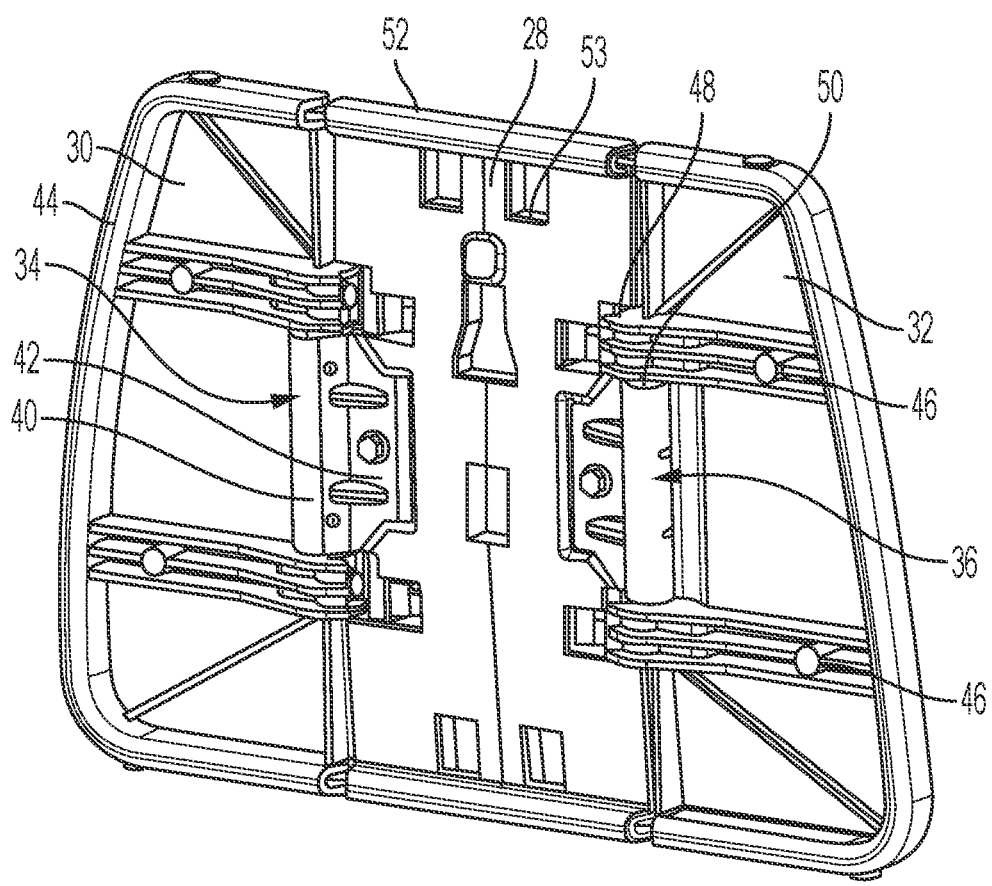
FIG. 4 is a front perspective view of a frame of the front portion in the non-adjusted position.
Figure 5:
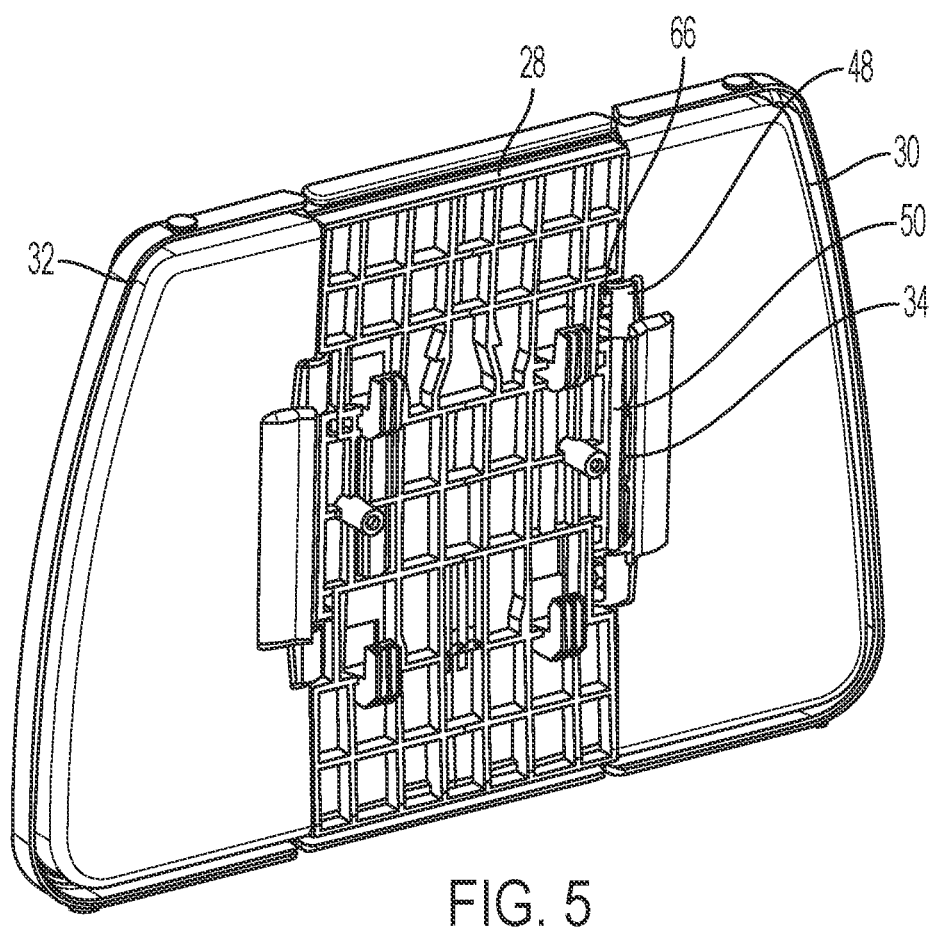
FIG. 5 is a rear perspective view of the frame of the front portion in the non-adjusted position.

With reference now to FIGS. 4 and 5, the central panel 18 includes a central frame 28, the first side panel 20 includes a first side frame 30, and the second side panel 22 includes a second side frame 32. The frame members 28, 30, 32 are formed of a rigid material. A first spring clip 34 pivotally connects the first side frame 30 to the central frame 28 and a second spring clip 36 pivotally connects the second side frame 32 to the central frame 28. Both spring clips 34, 36 include a cam portion 40 and a tail portion 42. The tail portion 42 is statically connected to the central frame 28 and the cam portion 40 is pivotally attached to one of the side frames 30, 32. As will be described in greater detail below, the first spring clip 34 and the second spring clip 36 are configured to pivot in opposite rotational directions, relative to each other.

As best illustrated in FIG. 4, the first side frame 30 and the second side frame 32 each include a support rim 44 surrounding edges of the side frames 30, 32 that are non-adjacent to the central panel 18. The first side frame 30 and second side frame 32 each also include a set of vertically spaced support ribs 46 that extend in the cross-car direction from the support rim 44 and terminate at a pin holding portion 48 adjacent to the central panel 18. A pin 50 that connects to the spring clip 34, 36 is located in each pin holding portion 48 such that it extends vertically between support ribs 46 about the first vertical axis V1 or the second vertical axis V2. The central frame 28 includes a central frame rim 52 that extends along opposite edges of the central frame 28 that are non-adjacent to the side panels 20, 22. As such, the support rim 44 of the side frames 30, 32 and the central frame rim 52 of the central frame 28 outline the entire frame assembly 28, 30, 32. The central frame 28 further includes a plurality of spaced apertures 53 for weight and material reduction that also ease installation and connection to corresponding parts, such as the rear portion 16, other parts of the central panel 18, and the cover and cushion.

Figure 6:
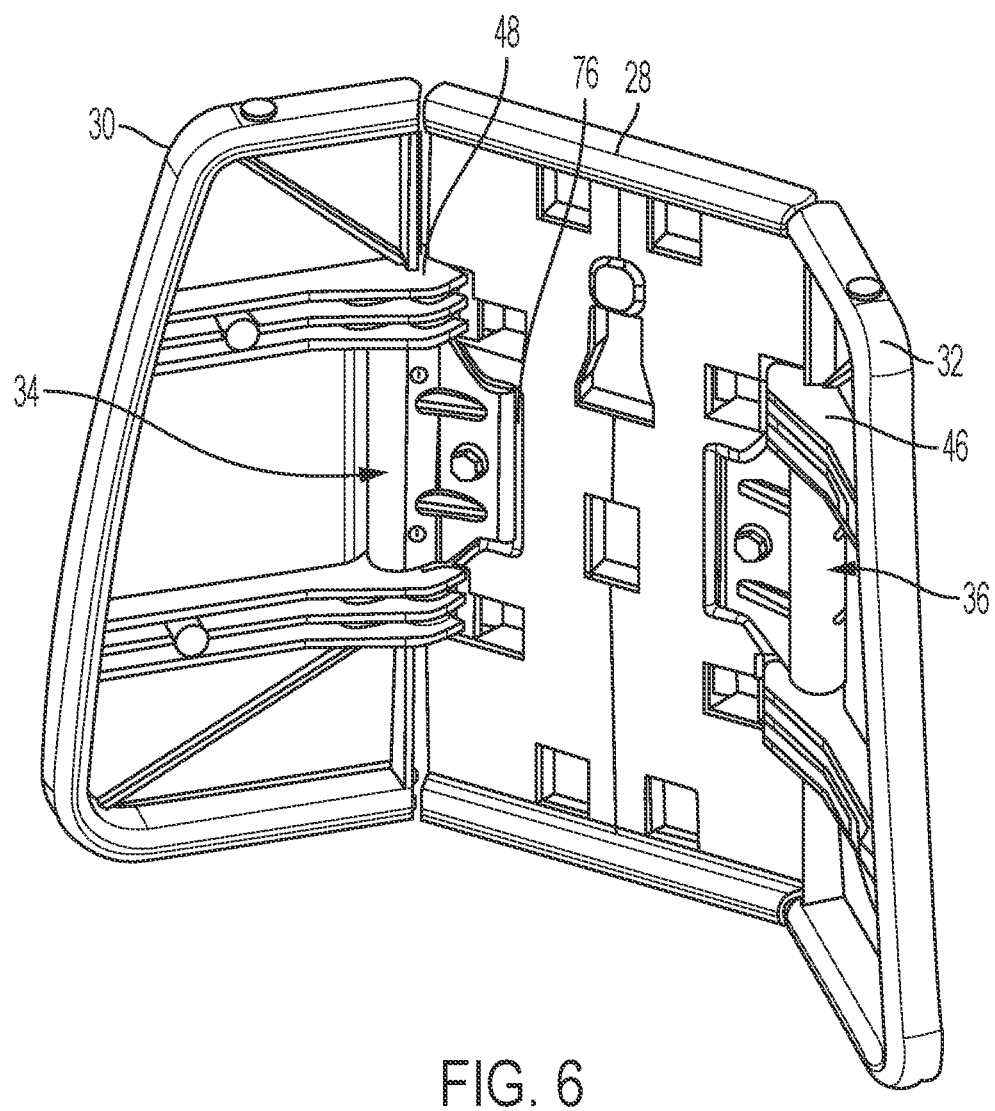
FIG. 6 is a front perspective view of the frame of the front portion in the adjusted position, wherein the frame includes a pair of moveable side panels.
Figure 7:
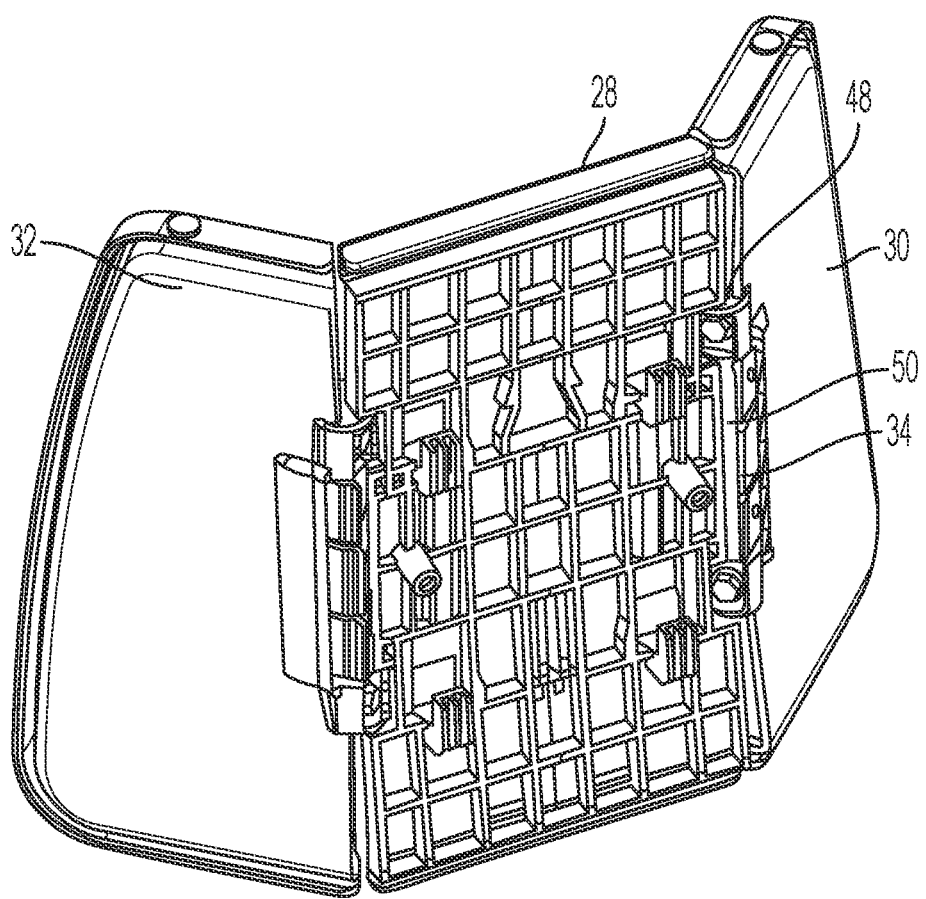
FIG. 7 is a rear perspective view of the frame of the front portion in the adjusted position.
Figure 8:
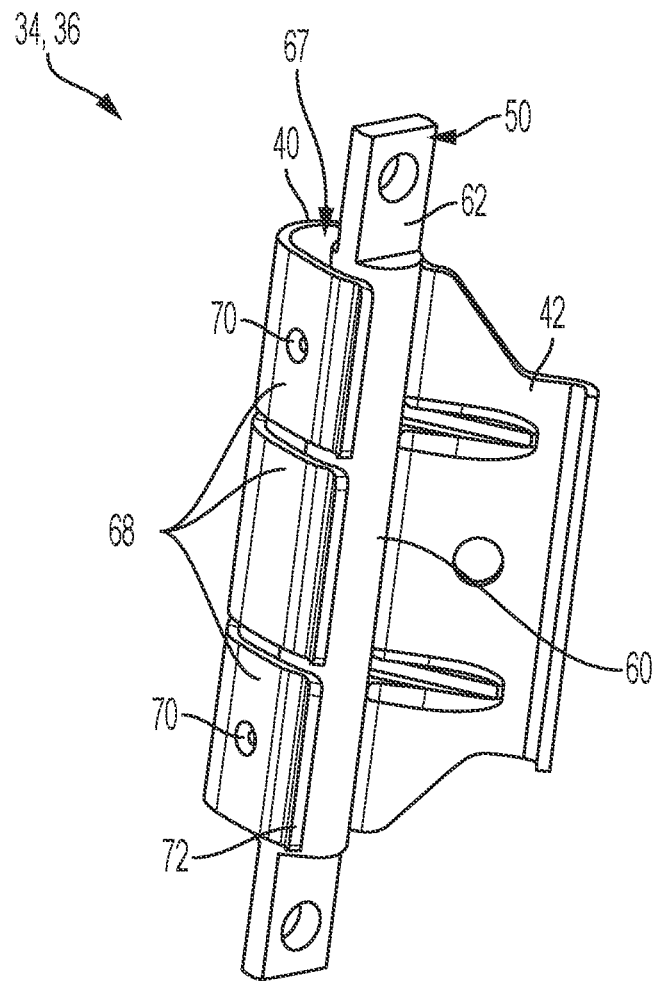
FIG. 8 is a perspective view of a spring clip that effectuates movement of the side panels.

With reference now to FIGS. 6 and 7, the frame assembly is shown in the adjusted position corresponding to FIGS. 2 and 3. In the adjusted position, one or both of the side frames 30, 32 have been pivoted relative to the central frame 28. More particularly, the adjusted position is accomplished when movement of the side frames 30, 32 cause to the pin 50 to rotate within the cam portion 40 of the spring clip 34, 36. The cam portion 40 is sized to squeeze the pin 50 such that the angle of the side frames 30, 32 with respect to the central frame 28 is maintained absent manual adjustments. As best shown in FIG. 8, each pin 50 includes a central shaft 60 that interfaces with the cam portion 40 and a pair of flat sections 62 on opposite ends of the shaft 60. Each flat section 62 includes a hole 64 for statically connecting the pin 50 to the ribs 46 with a fastener 66 (see FIG. 5).

Figure 9:
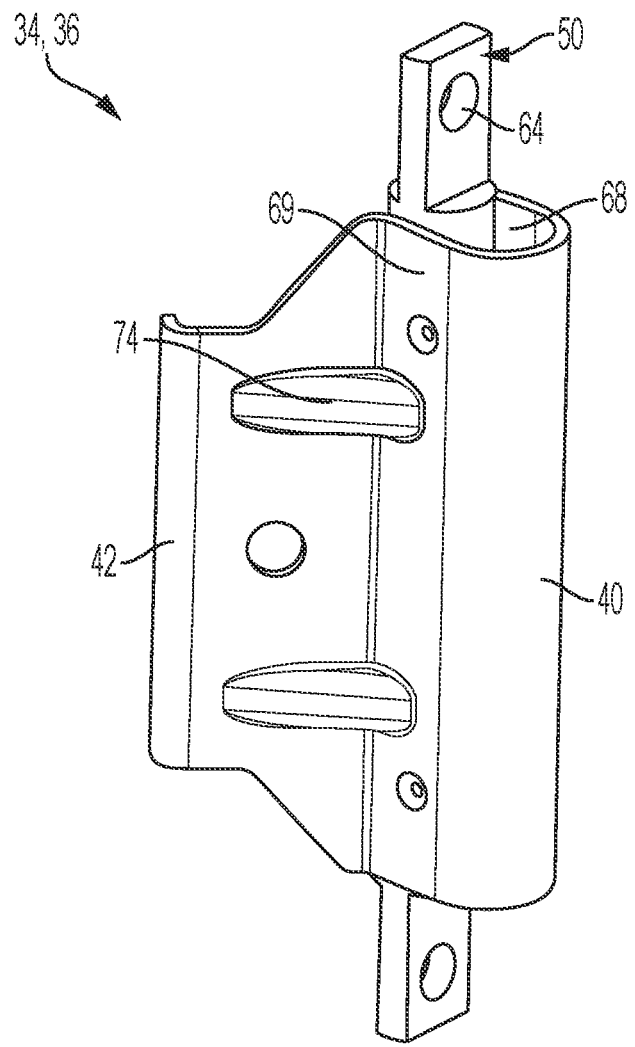
FIG. 9 is another perspective view of the spring clip.

The spring clip 34, 36 and pin 50 are shown from a perspective view in FIGS. 8 and 9. As best shown in FIG. 8, the cam portion 40 has a semi-circle shaped opening 67 defined by a plurality of three fingers 68, which in some arrangements may include at least one finger 68, and a side wall 69 (FIG. 9). The three fingers 68 includes two outer fingers 68 and one central finger 68. The two outer fingers 68 include dimples 70 extending inwardly into the opening 67 towards the pin 50. Each finger 68 further includes a flared portion 72 (see FIGS. 10 and 11) to facilitate insertion of the pin 50.

Figure 10:
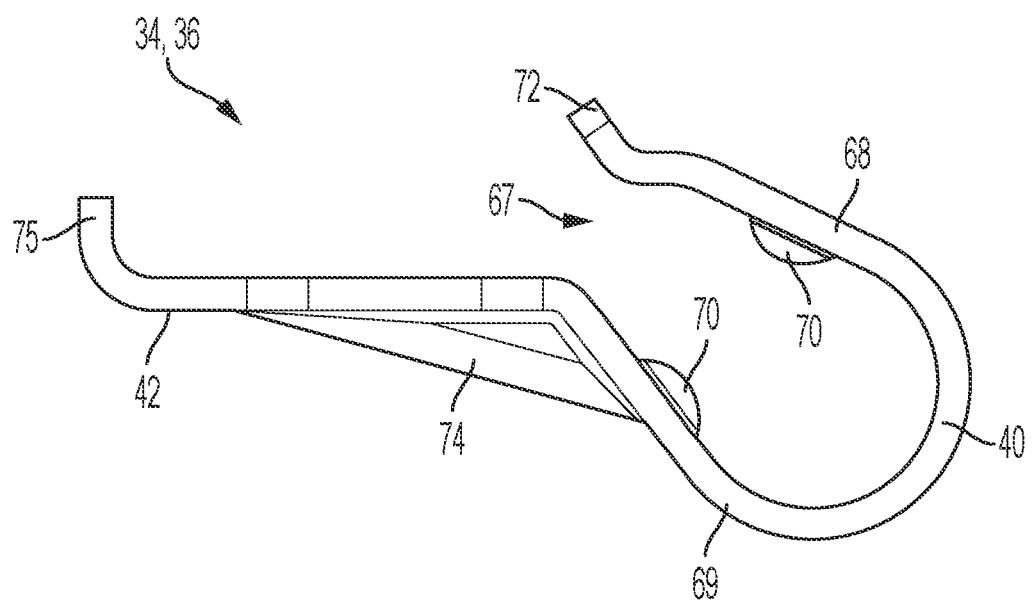
FIG. 10 is a top view of the spring clip.
Figure 11:
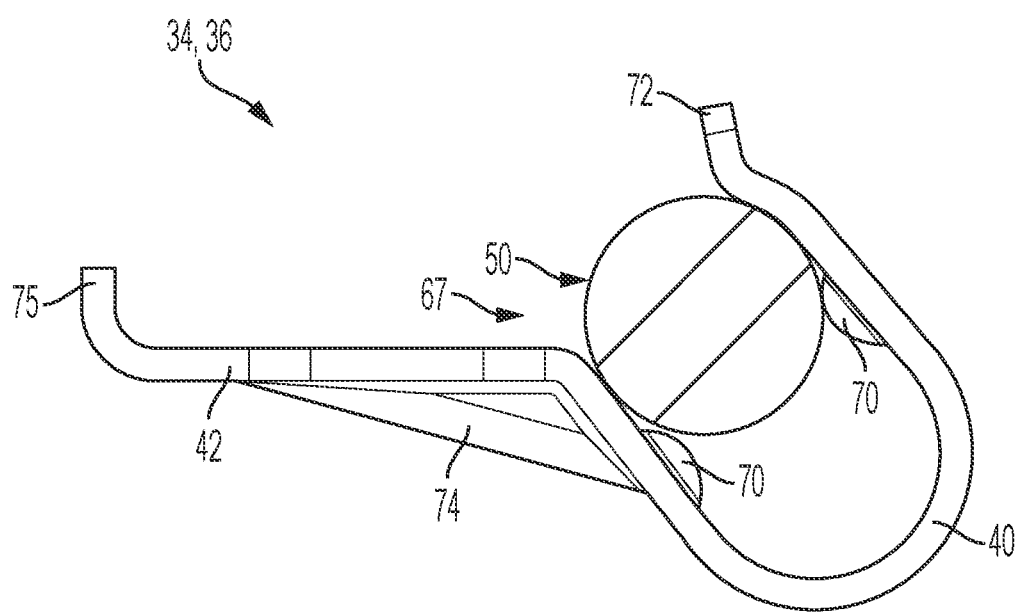
FIG. 11 is a top view of the spring clip with a pin inserted therein.

As best shown in FIGS. 10 and 11, a pair of support brackets 74 extends between the tail portion 42 and the cam portion 40 of the spring clip 34, 36. The tail portion 42 includes a hook 75 opposite the cam portion 40 that fits into corresponding grooves 76 (see FIG. 6) within the central frame 28. A pair of dimples 70 are located on the opposite side of the opening 67 from the dimples 70 on the fingers 68. In FIG. 10 the cam portion 40 is shown without the pin 50 inserted therein and in FIG. 11 the cam portion 40 is shown with the pin 50 inserted therein. When the pin 50 is not inserted within the cam portion 40, the fingers 68 are loaded such that a semi-circular opening 67 is smaller than the pin 50. As such, insertion of the pin 50 causes the fingers 68 to flex outwardly and forcefully bias towards the pin 50, causing the dimples 70 to press into the pin 50.

Figure 12:
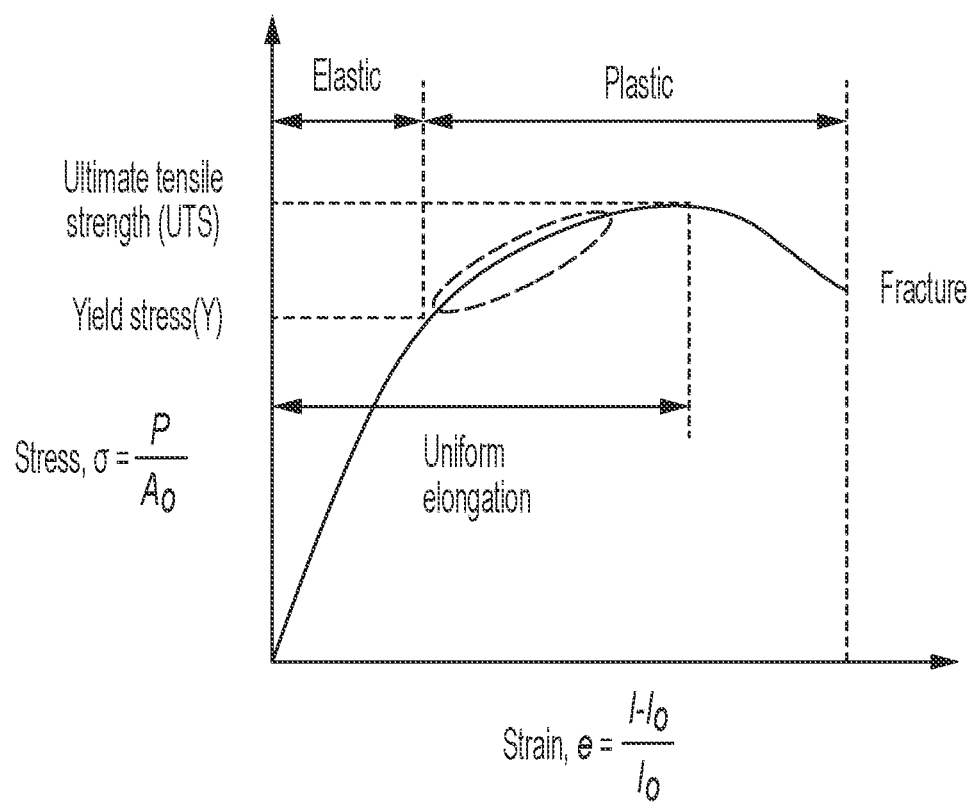
FIG. 12 is a graphical illustration of the spring clip that compares values of the stress to the values of strain.

FIG. 12 provides a graphical representation of the spring clip 34, 36 that compares values of the stress to the values of strain. Depending on the application, the spring clip 34, 36 and pin 50 may be configured such that the spring clip 34, 36 operates between the yield stress (Y) and the ultimate tensile strength (UTS). As illustrated, the pin 50 may be sized to effectuate elastic deformation, plastic deformation, or a combination of deformation within the cam 40 of the spring clips 34, 36. Modifying values of materials and sizes can be used to vary the spring clip 34, 36 and pin 50 tolerances. In one example arrangement, the spring clip 34, 36 is formed out of 1074-1075 tempered spring steel and the pin is formed of 1038 steel with an HRC of 47 to 55. However, it is to be understood that this example is non-limiting since it is contemplated that one skilled in the art may find suitable alternative materials.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A headrest assembly for use in a vehicle comprising:
   a housing having a front portion and a rear portion, the front portion including a central panel, a first side panel, and a second side panel;
   a first spring clip connecting the first side panel to a first side of the central panel;
   a second spring clip connecting the second side panel to a second side of the central panel;
   a first pin operatively coupled to the first side panel and rotatable within a portion of the first spring clip to allow rotation of the first side panel relative to the central panel; and
   a second pin operatively coupled to the second side panel and rotatable within a portion of the second spring clip to allow rotation of the second side panel relative to the central panel;
   wherein each of the first pin and the second pin comprises a central portion and a pair of planar end segments, each end of the pair of planar end segments defining an aperture for receiving a fastener that connects the pin to one of the first and second side panels,
   wherein each of the first spring clip and the second spring clip comprises:
      a tail portion coupled to the central portion; and
      a cam portion in contact with the respective pin to maintain an angular position of the first side panel and the second side panel relative to the central panel.

2. The headrest assembly of claim 1, wherein the central portion has a circular cross-section.

3. The headrest assembly of claim 1, wherein the first side panel and the second side panel pivot in an opposite rotational directions about at least one vertical axis between a non-adjusted position and an adjusted position.

4. The headrest assembly of claim 3, wherein the at least one vertical axis includes a first vertical axis and a second vertical axis, the second vertical axis spaced from the first vertical axis, and wherein the first side panel pivots about the first vertical axis and the second side panel pivots about the second vertical axis.

5. The headrest assembly of claim 4, wherein the first side panel and the second side panel are each pivotable about their respective vertical axis up to a rotational angle of 90 degrees.

6. The headrest assembly of claim 4, wherein the first side panel and the second side panel are each pivotable about their respective vertical axis up to a rotational angle of 45 degrees.

7. The headrest assembly of claim 1, wherein the first spring clip and the second spring clip are each configured to operate between a yield stress (Y) and an ultimate tensile strength (UTS).

8. A headrest assembly for use in a vehicle comprising:
   a housing having a front portion and a rear portion;
   an armature operatively coupling the rear portion to a seatback of an automobile seat;

the front portion including a central panel, a first side panel, and a second side panel;

a first spring clip connecting the first side panel to a side of the central panel and a second spring clip connecting the second side panel to an opposite side of the central panel;

wherein the first spring clip and second spring clip each include a cam portion to allow the first side panel and the second side panel to pivot about at least one substantially vertical axis relative to the central panel; and a first pin operatively coupled to the first side panel and rotatable within a portion of the first spring clip to allow rotation of the first side panel relative to the central panel; and a second pin operatively coupled to the second side panel and rotatable within a portion of the second spring clip to allow rotation of the second side panel relative to the central panel;

wherein each of the first pin and the second pin comprises a central portion and a pair of end segments, each of the pair of planar end segments defining an aperture for receiving a fastener that connects the pin to one of the first and second side panels.

9. The headrest assembly of claim 8, wherein the first side panel and the second side panel pivot in an opposite rotational directions about the at least one vertical axis between a non-adjusted position and an adjusted position.

10. The headrest assembly of claim 8, wherein the at least one vertical axis includes a first vertical axis and a second vertical axis, the second vertical axis spaced from the first vertical axis, and wherein the first side panel pivots about the first vertical axis and the second side panel pivots about the second vertical axis.

11. The headrest assembly of claim 10, wherein the first side panel and the second side panel are each pivotable about their respective vertical axis up to a rotational angle of 90 degrees.

12. The headrest assembly of claim 10, wherein the first side panel and the second side panel are each pivotable about their respective vertical axis up to a rotational angle of 45 degrees.

13. The headrest assembly of claim 8, wherein the first spring clip and the second spring clip are each configured to operate between a yield stress (Y) and an ultimate tensile strength (UTS).

14. The headrest assembly of claim 8, wherein the first spring clip and the second spring clip each include a tail portion statically connected to the central panel.

\* \* \* \* \*